(12) United States Patent
Kurosaki et al.

(10) Patent No.: US 7,998,634 B2
(45) Date of Patent: *Aug. 16, 2011

(54) FUEL CELL WITH CONTROL PROCESS FOR REACTANT PRESSURE AND FLOW

(75) Inventors: Kouji Kurosaki, Saitama-ken (JP); Jiyunji Uehara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 724 days.

This patent is subject to a terminal disclaimer.

(21) Appl. No.: 11/477,692

(22) Filed: Jun. 29, 2006

(65) Prior Publication Data

US 2007/0015014 A1 Jan. 18, 2007

Related U.S. Application Data

(63) Continuation of application No. 09/915,936, filed on Jul. 5, 2001, now Pat. No. 7,297,427.

(30) Foreign Application Priority Data

Jul. 25, 2000 (JP) ................................. 2000-223194

(51) Int. Cl.
*H01M 8/04* (2006.01)

(52) U.S. Cl. ........................................ 429/444; 429/513
(58) Field of Classification Search ................. None
See application file for complete search history.

(56) References Cited

U.S. PATENT DOCUMENTS

| 4,838,020 | A | 6/1989 | Fujitsuka et al. | |
|---|---|---|---|---|
| 5,366,821 | A * | 11/1994 | Merritt et al. | 429/21 |
| 6,110,111 | A | 8/2000 | Barnard | |
| 6,393,354 | B1 | 5/2002 | Scheffler et al. | |
| 6,582,841 | B2 | 6/2003 | Okamoto et al. | |
| 6,703,152 | B2 | 3/2004 | Komiya et al. | |
| 6,773,837 | B1 * | 8/2004 | Kai et al. | 429/13 |
| 7,297,427 | B2 * | 11/2007 | Kurosaki et al. | 429/25 |

FOREIGN PATENT DOCUMENTS

| JP | 58-12268 | 1/1983 |
|---|---|---|
| JP | 61-80762 | 4/1986 |
| JP | 62-82659 | 4/1987 |
| JP | 2000-188119 | 7/2000 |

OTHER PUBLICATIONS

Geankoplis, Christie J., "Transport Processes and Unit Operations," Third Edition, Englewood Cliffs: Prentice Hall PTR, pp. 138-139 (1993).

* cited by examiner

*Primary Examiner* — Keith Walker
(74) *Attorney, Agent, or Firm* — Nelson Mullins Riley & Scarborough LLP; Anthony A. Laurentano (57) ABSTRACT

A fuel cell system comprising a fuel cell, which generates power by supplying anode gas and cathode gas into the fuel cell, a compressor which controls the amount of the gas to be supplied into the fuel cell, and a pressure control valve which controls the gas pressure of the fuel cell and which is provided on the downstream of the fuel cell, is controlled by changing an amount of the supply gas by said compressor, and thereafter changing the opening of said pressure control valve during the transition period of the fuel cell.

9 Claims, 5 Drawing Sheets

FUEL CELL WITH CONTROL PROCESS FOR REACTANT PRESSURE AND FLOW

RELATED APPLICATIONS

This application is a Continuation of U.S. patent application Ser. No. 09/915,936 now U.S. Pat. No. 7,297,427 filed on Jul. 25, 2001, which claims priority to Japanese Patent Application No. 2000-223194 filed on Jul. 25, 2000 in Japan. The contents of the aforementioned United States patent is hereby incorporated by reference.

BACKGROUND OF THE INVENTION

1. Field of the Invention

The present invention relates to a fuel cell system which generates electricity through the reaction between hydrogen and oxygen, and process for controlling the fuel cell in the fuel cell system. More particularly, the invention relates to a fuel cell system having improved performance during the transition period, at which the power generation amount is changed, and a process for producing the same.

2. Description of Related Arts

In recent years, an electric powered vehicles each carrying various driving motors instead of the conventional engine has been developed. One example of such types of electric powered vehicles includes a fuel cell carried vehicle having a Proton Exchange Membrane Fuel Cell abbreviated as "PEM FC" (hereinafter PEM type fuel cell or simply referred to as fuel cell) as a power source for a driving motor, and such PEM type fuel cell carried vehicles have been sharply developed.

PEM FC comprises a stack structure having a lot of single cells, which are power generation units, laminated on each other. Each cell has a configuration composed of an anode side separator having a hydrogen passage, a cathode side separator having an oxygen passage, and a membrane-electrode assembly (hereinafter abbreviated as "MEA") intervened between these separators. MEA is composed of a proton exchange membrane abbreviated as PEM, each surface of PEM with a catalyst layer and a gas diffusion layer laminated one after another (one surface having an anode side catalyst layer and a gas diffusion layer and the other having a cathode side catalyst layer and a gas diffusion layer).

In such PEM FC, when hydrogen gas flows through the hydrogen passage from the inlet side to the outlet side of the anode and when air (as an oxidant gas) flows through the oxygen passage from the inlet side to the outlet side of the cathode, the protons permeate through PEM of MEA in a wet state from the anode side of each cell, migrating to the cathode side. This causes each cell to generate electromotive force of approximately 1 V. In PEM FC having such a power generation mechanism, air and hydrogen are continuously supplied to continue the power generation. Consequently, an air intake system, which compresses air, for example, by a compressor is provided at the inlet side of cathode, and an air exhaust system, for example, having a backpressure control valve, is provided on the outlet side of cathode. In addition, a hydrogen gas supply system, which supplies hydrogen by an ejector, is provided on the inlet side of anode.

As described above, in the fuel cell system having the air supply system, the air exhaust system, and the hydrogen supply system provided on the fuel cell, the revolution speed of the compressor is controlled to be increased or decreased by increasing or decreasing an amount of the air flowing to the cathode inlet, whereby a power generation amount (output current or output power) is controlled (increased or decreased). At this time, if the pressure difference between the poles, i.e., the difference between the hydrogen pressure and the air pressure, becomes unduly large, there is a fear of breaking PEM making up MEA. Consequently, the hydrogen gas pressure at the anode inlet side and the air pressure at the cathode inlet side are separately controlled so that the pressure difference between the poles falls within a tolerance range. Specifically, in the conventional fuel cell system, the revolution speed of the compressor is controlled to be a target value where the air-flow amount to the cathode inlet side is controlled to be a target air flow amount, and the opening of the backpressure control valve of the air exhaust system is controlled so that the air pressure becomes a target pressure.

Figure 5:
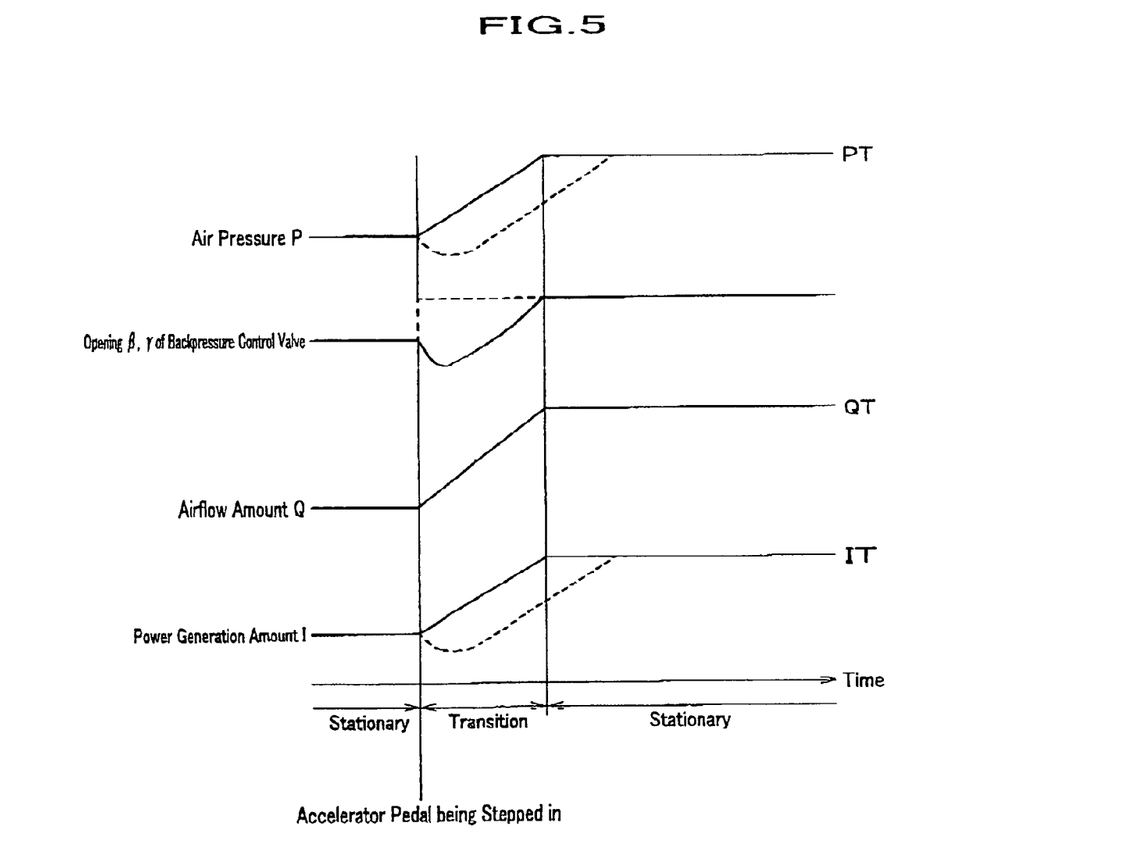
FIG. 5 is a graph showing control characteristics during the course of the transition in the fuel cell system according to one embodiment of the present invention.

Meanwhile, it takes a very short period that the opening of the backpressure control valve reaches a target value in comparison with the period that the air pressure reaches a target air pressure. However, in the conventional fuel cell system, the opening of the backpressure control valve is sharply controlled so as to be a target value corresponding to the target airflow amount. For example, as shown in FIG. 5, when the airflow amount Q is increased to a given target airflow amount QT, the opening γ of the backpressure control valve is sharply controlled to be a target value corresponding to the target airflow amount QT as shown in the broken line. For this reason, at the transition period until the airflow amount Q reaches the target airflow amount QT, the backpressure control valve is excessively wide-opened to the target opening corresponding to the target airflow amount QT in advance and, thus, the pressure P of the air to be compressively transferred toward the cathode inlet by a supercharger is escaped toward downstream of the backpressure control valve. As a result, the air pressure P at the cathode inlet side is once decreased and then reaches a target air pressure PT, conducting that the pressure increase is delayed. The behavior at the time where the airflow amount Q is decreased to a given target airflow amount QT is that the air pressure P is once increased, and then reaches the target air pressure PT during the transition period, delaying the decreasing of the pressure.

In the conventional fuel cell system as described above, during the transition period when the airflow amount at the cathode inlet side is increased or decreased to a target airflow amount corresponding to the decreasing or increasing of the power generation amount, the air pressure at the cathode inlet side is once decreased or increased. Accordingly, there poses a problem that pressure difference between the poles in the fuel cell system (pressure difference between the anode side and the cathode side applied to PEM of MEA) is increased. Also, the conventional fuel cell system is disadvantageous in that there is a time lag until the air pressure at the cathode inlet reaches a target air pressure, leading to poor responsibility.

SUMMARY OF THE INVENTION

It is, therefore, an object of the present invention is to provide a fuel cell system and a process for controlling the same, which can prevent the increasing of the pressure difference between the poles in the fuel cell during the transition period when the airflow amount toward the cathode inlet reaches a target airflow amount, and which can solve a time lag until the air pressure at the cathode inlet side reaches a target air pressure.

According to the present invention, there is provided a process for controlling a fuel cell comprising a fuel cell, which generates power by supplying anode gas and cathode gas into the fuel cell, a compressor which controls the amount of the gas to be supplied into the fuel cell, and a pressure control valve which controls the gas pressure of the fuel cell and which is provided on the downstream of the fuel cell, said process comprising:

changing an amount of the supply gas by said compressor during the transition period of said fuel cell, and thereafter, changing the opening of said pressure control valve.

Also, there is provided a process for controlling a fuel cell comprising:

a flow amount feedback control step which controls the flow amount of the gas supplied into a fuel cell to be a prescribed value; and a pressure feedback control step which controls the pressure of the fuel cell to be a prescribed value, said feedback steps being stopped during the transition period of the fuel cell.

According to the present invention a fuel cell system is also provided, which comprises a fuel cell, which generates power by supplying anode gas and cathode gas into the fuel cell, a compressor which controls the amount of the gas to be supplied into the fuel cell, a pressure control valve which controls the gas pressure of the fuel cell and which is provided on the downstream of the fuel cell, airflow control means, which controls the airflow toward the cathode inlet side to be a target airflow amount corresponding to a target power generation amount of the fuel cell by controlling the revolution number of said compressor, and air pressure control means, which controls the air pressure at the cathode inlet to be a target air pressure corresponding to the target airflow amount by controlling the opening of said pressure control valve at the stationary state, and which controls the pressure control valve corresponding to the change in the airflow amount detected from said flow sensor to thereby control the air pressure to be the target air pressure during the transition period.

In the fuel cell system according to the present invention, said air pressure control means during the transition period preferably controls the opening of said pressure control valve depending upon the airflow amount detected from the flow sensor and upon the target air pressure.

Also, in the fuel cell system according to the present invention, said air pressure control means during the transition period is preferably kept operating until said airflow amount reaches the target airflow amount.

Furthermore, according to the present invention, there is also provided a process for controlling a fuel cell comprising controlling the power generation amount of the fuel cell by controlling the flow amount and the pressure of the air compressively transferred into the cathode inlet side of the fuel cell, and controlling said air pressure to be a target airflow amount corresponding the detected airflow amount, which is gradually changed, during the transition period of said fuel cell.

According to the process for controlling the fuel cell of the present invention and the fuel cell system of the present invention, which controls the amount of the supply gas and thereafter controls the opening of the pressure control valve, the increasing of the pressure difference between the poles within the fuel cell can be prevented, ensuring the prevention of the damage of PEM making up MEA of the fuel cell. What is more, the time delay by which the air pressure at the cathode inlet side reached the target air pressure can be solved, improving the response to the increasing or decreasing of the power generation amount of the fuel cell.

DESCRIPTION OF PREFERRED EMBODIMENTS

Figure 1:
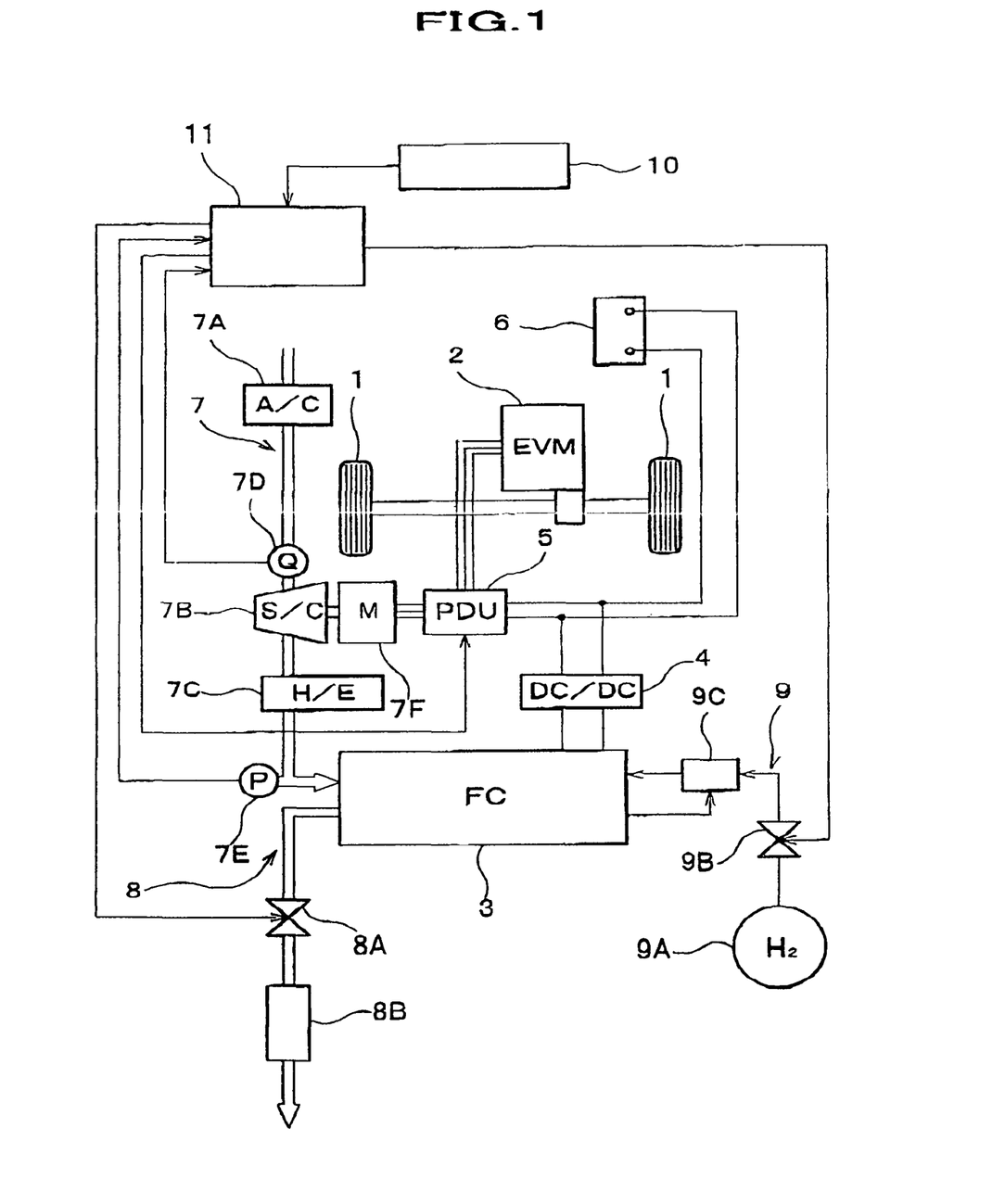
FIG. 1 is a configuration diagram of a vehicle drive line including a fuel cell carried on a vehicle according to one embodiment of the present invention.
Figure 2:
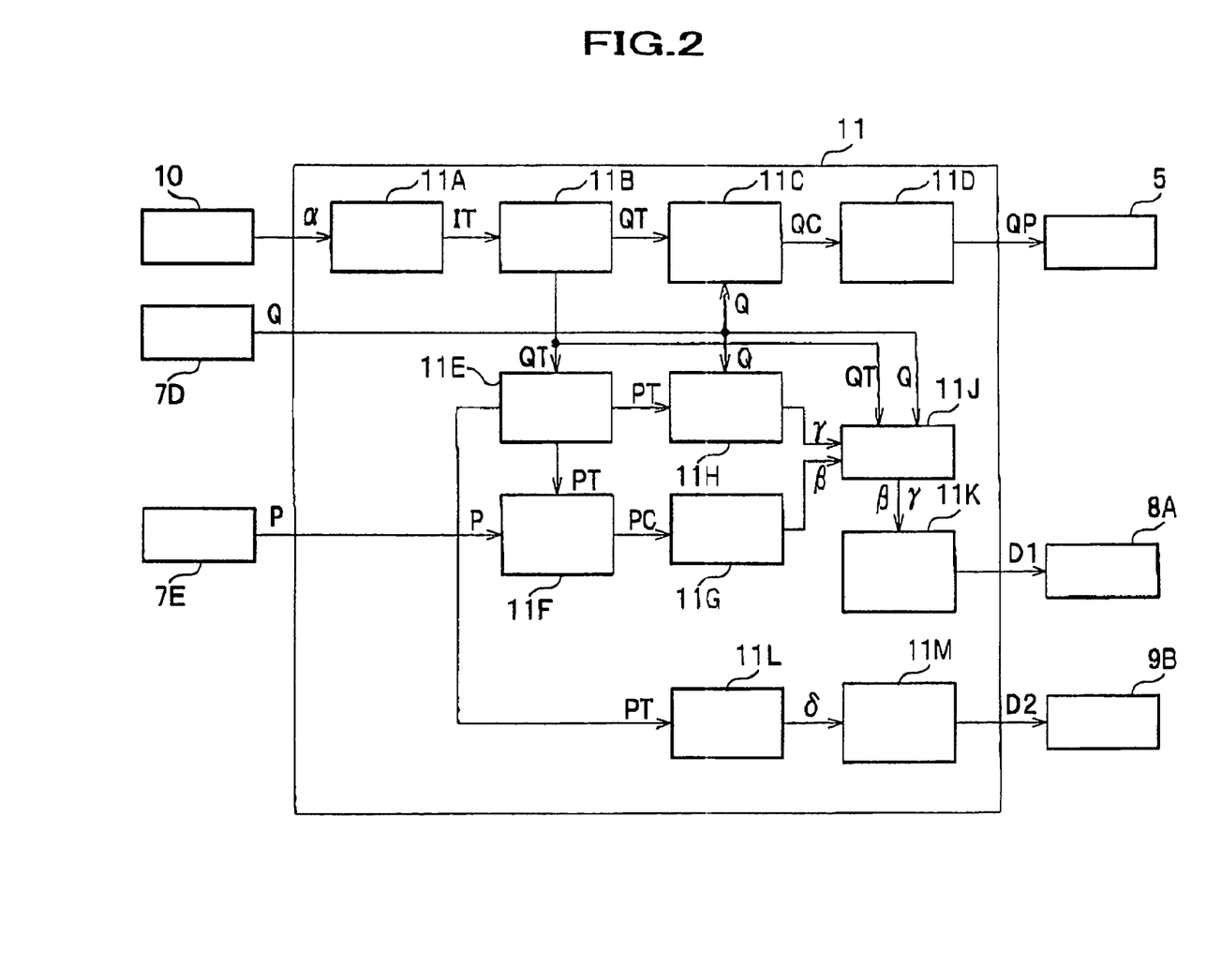
FIG. 2 is a functional block diagram of a control system of a fuel cell system according to one embodiment of the present invention.
Figure 3:
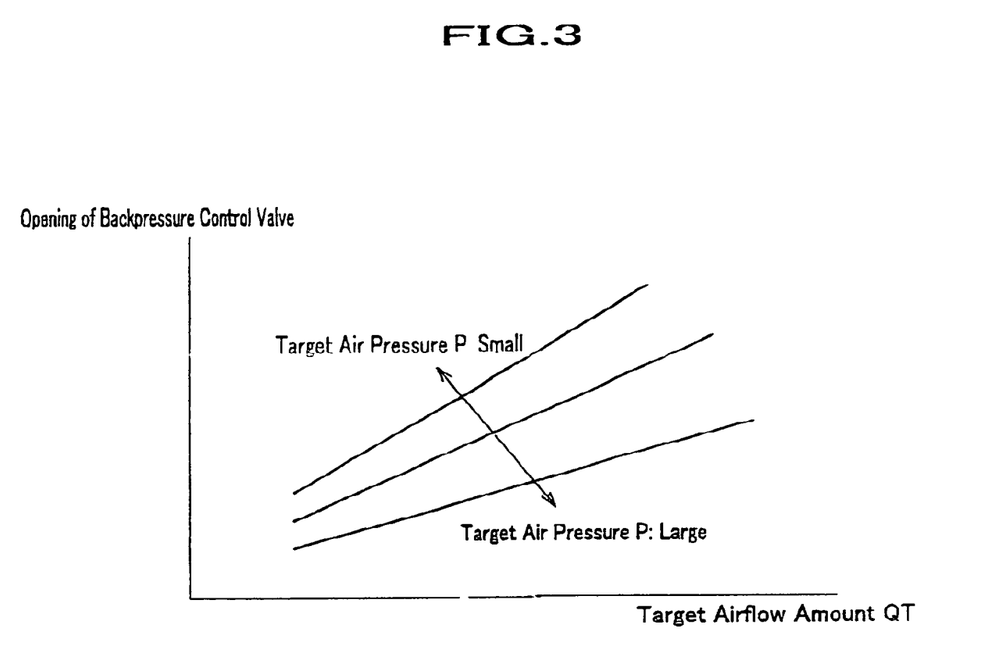
FIG. 3 is a graph showing the relation between a target airflow amount and a target air pressure in the fuel cell system according to one embodiment of the present invention.

Embodiments of a fuel cell system and a process for controlling the fuel cell system according to the present invention will now be described by referring to the attached drawings in which FIG. 1 is a configuration diagram of a vehicle drive line including a fuel cell carried on a vehicle according to one embodiment of the present invention, FIG. 2 is a functional block diagram of a control system of a fuel cell system according to one embodiment of the present invention, and FIG. 3 is a graph showing the relation between a target airflow amount and a target air pressure in the fuel cell system according to one embodiment of the present invention.

First, the configuration of a vehicle drive line of a vehicle having a fuel cell system according to the present invention carried thereon will now be described by referring to FIG. 1. The vehicle is a so-called an electric vehicle which carries a fuel cell (FC) 3 as an electric power source for a power driving motor (traction motor) (EVM) 2, which rotatably drives a traveling wheel 1. The fuel cell (FC) 3 has a circuit configuration that the fuel cell (FC) 3 loads power to a power driving unit (PDU) 5 and a battery 6 via a high-pressure distributor (DC/DC) 4. The power driving unit 5 has a circuit configuration so that the power driving unit 5 at least drives the power driving motor 2 described above, and a driving motor 7F for a supercharger (S/C) 7B, which serves as a compressor and which will be described fully later on.

The fuel cell (FC) 3 is a PEM type fuel cell having a plurality of cells, each of which is a power generation unit, laminated thereon. The fuel cell (FC) 3 has an air intake system 7, which supplies air (oxygen) to a cathode inlet side, and an air exhaust system 8, which discharges the air from the cathode outlet side. Also provided on the fuel cell (FC) 3 is a hydrogen intake system 9, which supplies hydrogen gas to an anode inlet side.

On the air intake system 7 of the fuel cell (FC) 3, from the upstream side toward the downstream side, an air cleaner (A/C) 7A, the supercharger (S/C) 7B, and an intercooler (heat exchanger) (H/C) 7C are placed. The air intake system 7 has a flow mater 7D, which detects an amount of air flowing toward the cathode inlet side, provided on the upstream of the supercharger (S/C) 7B, and a pressure sensor 7E, which detects an air pressure around the cathode inlet of the fuel cell (FC) 3. Any air type of cleaner can be used as the air cleaner (A/C) 7, as long as it has a function of filtering the flowing air. It is also possible to provide an air-intake silencer such as a resonator at the upstream of the air cleaner (A/C) 7A.

The supercharger (S/C) 7B can be driven at a rotation speed ranging from 0 to 12,000 rpm, and can linearly change an airflow amount Q depending upon the rotation speed. The supercharger (S/C) 7B is driven in a rotatable manner through driving current supplied at a given duty ratio supplied from the drive unit (PDU) 5, whose rotation number is controlled in a variable manner at a changing ratio of 12,000 rpm.

The intercooler (H/E) 7C serves as a heat exchanger, which allows the power driving motor (EVM) 2, the fuel cell (FC) 3, the high-pressure distributor (DC/DC) 4, the power driving unit (PDU) 5, and the driving motor 7F for cooling in a thermally exchangeable manner through a coolant.

Examples of the flow sensor 7D, which can be mentioned, include various types of airflow meters (airometers), such as vane type, Karman vortex type, and hot-wire type airflow meters. As the pressure sensor 7E, an appropriate type pressure sensor, such as a semiconductor type pressure sensor, can be used.

The air exhaust system 8 of the fuel cell (FC) 8 has a backpressure control valve 8A for controlling air pressure P at the cathode inlet side of the fuel cell (FC) 3. The backpressure control valve 8A has a CV value (capacity of valve) of about 8.5 and the valve-opening speed of approximately 8,000 degree/sec. In the backpressure control valve 8A, the opening is controlled at a interval of 10 ms.

On the other hand, from the upstream toward the downstream, the hydrogen intake system 9 of the fuel cell (FC) 3 has a hydrogen tank 9A, a pressure control valve 9B, and ejector 9C. It is noted that the hydrogen intake system 9 is configured so that the hydrogen gas remaining unused in power generation and exhausted from the anode outlet is recycled into the ejector 9C.

The fuel cell system according to one embodiment of the present invention has a control unit 11 which at least inputs detected signals from the flow sensor 7D, the pressure sensor 7E, an accelerator sensor 10, which will be described fully later on, and which outputs control signals to the power driving unit (PDU) 5, the backpressure control valve 8A, and the pressure control valve 9B, respectively. The control unit 11 is composed of, as hardware, an input/output interface I/O between the control unit 11 and the flow sensor 7D, the pressure sensor 7E, the accelerator sensor 10, the backpressure control valve 8A, the pressure control valve 9B, etc., and an analog/digital (A/D) converter, which converts analog signals input from the flow sensor 7D, the pressure sensor 7E and the accelerator sensor 10 to digital signals, Read Only Memory (ROM), which memorizes various data and programs, as well as Random Access Memory (RAM), which temporarily memorizes various data, Central Processing Unit (CPU), which executes various calculation, and the like.

As the software configuration, the control unit 11 is composed of airflow control means (program), which controls the flow amount Q of the air flowing toward the cathode inlet side of the fuel cell (FC) 3 to be a target airflow amount corresponding to a target power generation amount of the fuel cell (FC) 3 by controlling the rotation speed of the supercharger (S/C) 7B, and air pressure control means (program), which controls the air pressure P at the cathode inlet to be a target air pressure corresponding to the target airflow amount through controlling the opening of the backpressure control valve 8A. Also, contained in the control unit 11 is hydrogen gas pressure control means (program), which controls the hydrogen gas pressure at the anode inlet side to be a target hydrogen pressure corresponding to the target air pressure through controlling the opening of the pressure control valve 9B. Particularly, the control unit 11 according to this embodiment has air pressure control means during the transition period. Specifically, during the transition period that the airflow amount Q is gradually changed toward the target airflow amount according to the change in a target power generation amount, the opening of the backpressure control valve 8A is controlled one after another corresponding to the change in the airflow amount Q, which is detected by the flow sensor 7D one after another whereby air pressure control means, which controls the air pressure P during the transition period is controlled one after another is configured.

In order to attain the functions of the airflow amount control means, the air pressure control means, the hydrogen gas pressure control means, and the air pressure control means during the transition period, the control unit 11 has respective functional blocks as shown in FIG. 2. Specifically, as a block for attaining the function of the airflow amount control means, the control unit 11 possesses a unit 11A for setting a target power generation amount, a unit 11B for setting a target airflow amount, a unit 11C for feedback-controlling an airflow amount, and a unit 11D for outputting a control signal for controlling the power driving unit. As the block for attaining the function of controlling the air pressure control means, the control unit 11 possesses a unit 11E for setting a target air pressure, a unit 11F for feedback-controlling the air pressure, a unit for instructing the opening of the backpressure control valve, a unit 11J for switching the input, a unit 11K for outputting a control signal for controlling the opening, and a unit 11H for setting the opening the backpressure control valve. The control unit 11 also possesses as the block for attaining the function of the hydrogen pressure control means, a unit 11L for setting the opening of the pressure control valve and a unit 11M for outputting a control signal for controlling the opening of the pressure control valve.

Each of the functional blocks possessed by the control unit 11 will now be described. To the unit 11A for setting a target power generation amount is input a signal α of an accelerator angle from an accelerator sensor 10. The accelerator sensor 10 is composed, for example, of a potentiometer, which detects an angle α of the accelerator pedal (not shown) to be stepped in corresponding to the change in the load of the fuel cell carried vehicle. The angle α of the accelerator pedal output from the accelerator sensor 10, which is an analog signal, is then converted into a digital signal, which is input to the unit 11A for setting a target power generation amount. The unit 11A for setting a target power generation amount makes a map research for seeking a target power generation amount corresponding to the signal of the accelerator angle α, and a signal concerning the researched target power generation amount IT is output to the unit 11L for setting the opening of the pressure control valve.

Based upon the signal concerning the researched target power generation amount IT input from the unit 11A for setting a target power generation amount, the unit 11B for setting a target airflow amount makes a map research for seeking an airflow amount required for attaining the target power generation amount IT, and outputs the signal concerning the target airflow amount QT to the unit 11C for feedback-controlling an airflow amount and the unit 11E for setting a target air pressure.

To the unit 11C for feedback-controlling an airflow amount are input the signal concerning a target airflow amount QT from the unit 11B for setting a target airflow amount, and the airflow amount Q detected from the flow sensor 7D, converted from the analog data into digital data. The unit 11C for feedback-controlling an airflow amount outputs to the unit 11D for outputting a control signal for controlling the power driving unit, a PID actuation signal QC for rapidly converging the deviation of the airflow amount Q to the target airflow amount QT upon zero by carrying out proportion, integration, or differentiation.

The unit 11D for outputting a control signal for controlling the power driving unit produces a pulse width modulation signal (PWM signal) for controlling the current for running through the driving motor 7F through pulse modulation based upon the PID actuation signal QC, and output it to the power driving unit (PDU) 5.

The power driving unit (PDU) 5 is rotates the driving motor 7E at driving current with a prescribed polarity and a prescribed duty ratio by switching operation of a bridging circuit of a power field effect transistor (FET) (not shown) based upon the PID actuation signal QC from the unit 11D for outputting a control signal for controlling the power driving unit. Specifically, the driving motor 7E is rotated so that the supercharger (S/C) 7B attains the target airflow amount QT. Although the detail description is omitted, the power driving unit (PDU) 5 is composed so as to rotatably drive the power driving motor (traction motor) (EVM) 2 at current with a prescribed duty ratio based upon the signal of the accelerator angel α of the accelerator sensor 10.

The unit 11E for setting a target air pressure makes a map research for seeking an air pressure required for attaining the target airflow amount QT within the CV value of the backpressure control valve 8A based upon the signal concerning the target airflow amount QT, with reference to the map having characteristics as shown in FIG. 3. The target QT searched as described above is then output to the unit 11F for feedback-controlling the air pressure, the unit 11H for setting the opening the backpressure control valve, and the unit 11L for setting the opening of the pressure control valve.

To the unit 11F for feedback-controlling the air pressure are input the signal concerning a target air pressure PT from the unit 11E for setting a target air pressure, and the air pressure P output from the pressure sensor 7E, converted from the analog data into digital data. The unit 11F for feedback-controlling the air pressure outputs to a unit 11G for indicating the opening of the backpressure control valve a PID actuation signal PC for rapidly converging the deviation between the air pressure P and the target pressure PT upon zero by carrying out proportion (P), integration (I), or differentiation (D).

Based upon the PID actuation signal PC, the unit 11G for indicating the opening of the backpressure control valve makes a map research for seeking an opening of the backpressure control valve 8A required for obtaining the target air pressure PT within the CV value of the backpressure control valve 8A, and the signal β for indicating the opening is output to the unit 11J for switching the input.

To the unit 11H for setting the opening the backpressure control valve, the signal concerning the target air pressure PT from the unit 11E for setting a target air pressure is input, as well as the signal of the airflow amount Q from the flow sensor 7D is input at every 10 ms cycle. Based upon the signal of the target air pressure and based upon the signal of the airglow amount Q, which is gradually changed toward the target airflow amount Qt, the unit 11H for setting the opening the backpressure control valve makes a map research for seeking an opening of the backpressure control valve 8A required for attaining the target air pressure PT one after another at an interval of 10 ms within the CV value of the backpressure control valve 8A, and the resulting signal γ for setting the opening of the valve is output to the unit 11J for switching the input, while altering the signal γ for setting the opening of the valve at an interval of 10 ms.

To the unit 11J for switching the input, the signal β for indicating the opening from 11G for indicating the opening of the backpressure control valve and the signal γ for setting the opening of the valve from the unit 11H for setting the opening the backpressure control valve are input, and the signal of the airflow amount from the flow sensor Q and the signal of the target airflow amount from the unit 11B for setting a target airflow amount are also input thereto. By comparing the airflow amount Q with the target airflow amount QT, the unit 11J for switching the input outputs the signal γ for setting the opening of the valve from the unit 11H for setting the opening the backpressure control valve to the unit 11K for outputting a control signal for controlling the opening during the course of the transition period until the airflow amount T reaches the target airflow amount QT, while the unit 11J for switching the input outputs the signal β for indicating the opening from the unit 11G for indicating the opening of the backpressure control valve to the unit 11K for outputting a control signal for controlling the opening under the stationary conditions after the airflow amount Q reaches the target airflow amount QT.

The unit 11K for outputting a control signal for controlling the opening outputs a driving signal D1 having a given polarity and a given duty ratio in order to PWM control the opening of the backpressure control valve 8A produced based upon the signal γ for setting the opening of the valve from the unit 11H for setting the opening the backpressure control valve or the signal β for indicating the opening to the unit 11G for indicating the opening of the backpressure control valve.

Based upon the target air pressure PT from the unit 11E for setting a target air pressure, the unit 11L for setting the opening of the pressure control valve makes a map research for seeking a target hydrogen gas pressure slightly greater than the target air pressure, also makes a map research for seeking an opening of the pressure control valve 9B required for attaining the target hydrogen gas pressure, and outputs the signal δ for setting the opening of the valve to the unit 11M for outputting a control signal for controlling the opening of the pressure control valve.

The unit 11M for outputting a control signal for controlling the opening of the pressure control valve outputs a driving signal D2 having a given polarity and a given duty ratio in order to PWM control the opening of the pressure control valve 9B produced based upon the signal δ for setting the opening of the valve to the pressure control valve 9B.

In the fuel cell system according to the first embodiment configured as described above, when the power generation amount of the fuel cell (FC) 3 is increased, for example, if the accelerator pedal (not shown) is stepped in, the accelerator sensor 10 outputs an accelerator opening signal α corresponding to the amount of the accelerator to be stepped in to the control unit 11. The control unit 11 then controls the flow amount and the pressure of the air compressively transferred to the cathode side according to the change in the target power generation amount of the fuel cell (FC) 3 to be the target airflow amount QT and the target air pressure, respectively, as shown in the flowchart of FIG. 3, whereby the power generation amount of the fuel cell (FC) 3 is controlled to be the target power generation amount. In this case, during transition period that the airflow amount Q is gradually changed toward the target airflow amount QT, the air pressure P is controlled to be a target air pressure QT one after another corresponding to the gradual change in the airflow amount Q.

In the control unit 11, the unit 11A for setting a target power generation amount, which inputs the signal α of the accelerator opening from the accelerator sensor makes a map research for seeking a target power generation amount IT corresponding to the signal α of the accelerator opening (S1), and outputs the produced signal to the unit 11B for setting a target airflow amount. Subsequently, the unit 11B for setting a target airflow amount make a map search for seeking the target airflow amount required for attaining the target power generation amount IT (S2), and outputs the produced signal concerning the target airflow amount QT to the unit 11C for feedback-controlling an airflow amount and the unit 11E for setting a target air pressure, respectively. The flow sensor 7D detects the airflow amount Q at the cathode inlet side of the fuel cell (FC) 3 (S3), and outputs the detected signal to the unit 11C for feedback-controlling an airflow amount, the unit 11H for setting the opening the backpressure control valve, and the unit 11J for switching the input, respectively.

Subsequently, in order to converge the detected airflow amount Q to the target airflow amount QT, the unit 11C for feedback-controlling an airflow amount, the unit 11D for outputting a control signal for controlling the power driving unit, and the power driving unit (PDU) 5 execute feedback control of the revolution number of the supercharger (S/C) 7B (S4). Specifically, the unit 11C for feedback-controlling an airflow amount, which has input the signal concerning the target airflow amount QT and the signal concerning the airflow amount Q from the flow sensor 7D, outputs the PIM actuation signal for converging the deviation between the target airflow amount Qt and the detected airflow amount Q upon zero to the unit 11D for outputting a control signal for controlling the power driving unit. The unit 11D for outputting a control signal for controlling the power driving unit, which has input the PID actuation signal QC, produces a PWM control signal QP based upon the PID actuation signal QC, which is output to the power driving unit (PDU) 5. Subsequently, based upon the PWM control signal QP, the power driving unit (PDU) 5 drives the driving motor 7F in a rotatable manner at driving current with a prescribed polarity and a prescribed duty ratio whereby the revolution number of the supercharger (S/C) is increased one after another. This increases the airflow amount Q flowing into the cathode inlet side of the fuel cell (FC) 3 toward the target airflow amount QT one after another as shown in FIG. 5.

On the other hand, the unit 11E for setting a target air pressure, which has input the target airflow amount QT from the unit 11B for setting a target airflow amount, outputs a signal concerning the target air pressure PT required for attaining the target airflow amount QT within the CV value of the backpressure control valve 8A to the unit 11F for feedback-controlling the air pressure, the unit 11H for setting the opening the backpressure control valve, and the unit 11L for setting the opening of the pressure control valve, respectively.

The unit 11L for setting the opening of the pressure control valve, which has input the target air pressure PT, sets a target hydrogen gas pressure which is an appropriate pressure slightly greater than the target air pressure PT, and outputs a signal δ for setting the opening of the valve required for attaining the target hydrogen gas pressure to the unit 11M for outputting a control signal for controlling the opening of the pressure control valve. Then, the unit 11M for outputting a control signal for controlling the opening of the pressure control valve outputs a driving signal D2 having a given polarity and a given duty ratio in order to PWM control the opening of the pressure control valve 9B produced depending upon the signal δ for setting the opening of the valve to the pressure control valve 9B. As described above, the pressure of the hydrogen to be supplied into the anode inlet of the fuel cell (FC) 3 is adjusted to be an appropriate pressure slightly greater than the target air pressure PT.

Figure 4:
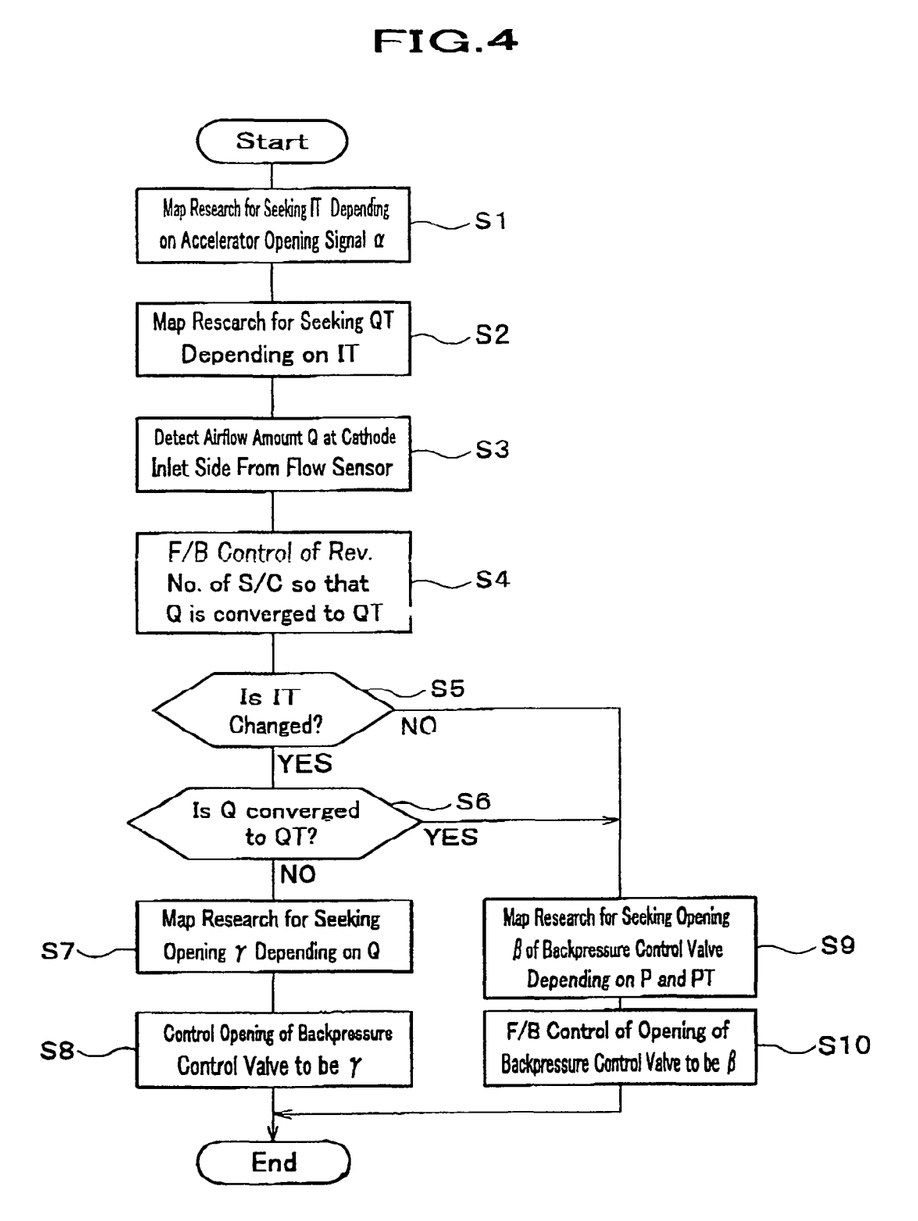
FIG. 4 is a schematic flowchart diagram illustrating the steps performed to determine whether the target power generation amount has changed.

Here, in the flowchart of FIG. 4, based upon the change Δα in the accelerator opening α with the time elapse or based upon the change ΔQT in the target airflow amount QT with the time elapse, the target power generation amount IT is judged whether it is changed or not, i.e., the control unit 11 judges whether or not the fuel cell (FC) 3 is in the transition period (S5). If the target power generation amount IT is judged to be changed in Step S5, i.e., in the transition period, the airflow amount Q is subsequently judged whether or not it is converged to the target flow amount QT (S6).

In the case, the result of the judgment in Step S6 is "NO", which is assumed to be during the transition period that the airflow amount Q flowing toward the cathode inlet side of the fuel cell (FC) 3 is gradually changed toward the target airflow amount QT, the unit 11H for setting the opening the backpressure control valve, the unit 11J for switching the input, and the unit 11K for outputting a control signal for controlling the opening controls the air pressure P at the cathode inlet side to be a target air pressure PT one after another corresponding to the airflow amount Q, which is gradually changed. Specifically, the unit 11H for setting the opening the backpressure control valve, which has input the signal of the target air pressure PT and the signal of the airflow amount Q from the flow sensor 7D, makes a map search for seeking the opening of the backpressure control valve 8A required for attaining the target air pressure PT one after another corresponding to the airflow amount Q, which is gradually increased toward the target airflow amount QT (S7), the signal γ for setting the opening of the valve is output to the unit 11J for switching the input, while altering the signal γ for setting the opening of the valve at 10 ms cycle. Subsequently, the unit 11J for switching the input outputs the signal γ for setting the opening of the valve from the unit 11H for setting the opening the backpressure control valve to the unit 11K for outputting a control signal for controlling the opening, and the unit 11K for outputting a control signal for controlling the opening outputs a driving signal D1 having a given polarity and a given duty ratio in order to PWM control the opening of the backpressure control valve 8A corresponding to the signal γ for setting the opening of the valve to the backpressure control valve 8A, whereby the opening of the backpressure control valve 8A is controlled to be γ (S8). In this case, the value of the signal γ for setting the opening of the valve is set to be such characteristics that it is once decreased at the initial stage of starting the increase in the airflow amount Q as shown in FIG. 5, and, thereafter, it is increased according to the increasing of the airflow amount Q. For this reason, the air pressure P at the cathode inlet side of the fuel cell (FC) 3 is increased one after another without once decreasing the pressure as in the case of the prior art shown as the broken line.

On the other hand, in the flowchart of FIG. 4, in the case where the judgment in Step S5 is "No" or where the judgment in Step 6 is "Yes", and the real airflow amount Q detected by the flow sensor 7D has reached the target airflow amount QT, the unit 11F for feedback-controlling the air pressure, the unit 11G for indicating the opening of the backpressure control valve, the unit 11J for switching the input, and the unit 11K for outputting a control signal for controlling the opening execute feedback control of the opening of the backpressure control valve 8A so that the real air pressure P detected from the pressure sensor 7E is converged to the target air pressure QT. Specifically, the unit 11F. for feedback-controlling the air pressure outputs to a unit 11G for indicating the opening of the backpressure control valve a PID actuation signal PC for rapidly converging the deviation between the detected air pressure P and the target pressure PT upon zero. Then, based upon the PID actuation signal PC, the unit 11G for indicating the opening of the backpressure control valve, which has input the PID actuation signal PC, makes a map research for seeking an opening of the backpressure control valve 8A required for obtaining the target air pressure PT within the CV value of the backpressure control valve 8A (S9), and the resulting signal β for indicating the opening is output to the unit 11J for switching the input. Subsequently, the unit 11J for switching input outputs the signal γ for setting the opening of the valve from the unit 11H for setting the opening the backpressure control valve 8A to the unit 11K for outputting a control signal for controlling the opening, and the unit 11K for outputting a control signal for controlling the opening outputs a driving signal D1 having a given polarity and a given duty ratio in order to PWM control the opening of the backpressure control valve 8A produced based upon the signal γ for setting the opening of the valve, whereby the opening of the opening of the backpressure control valve 8A is controlled to be β (S10).

Specifically, according to the fuel cell system and the process for controlling the fuel cell of the present invention, during the transition period that the airflow amount Q at the cathode inlet side of the fuel cell (FC) 3 is gradually changed toward the target airflow amount QT, corresponding to the change in the flow amount Q of the air flowing towards the cathode inlet side, which is detected one after another, the air pressure control means controls the air pressure P at the cathode inlet side to be the target air pressure PT one after another. Consequently, the increasing of the pressure difference between the poles within the fuel cell (FC) 3 can be prevented, ensuring the prevention of the damage of PEM making up MEA of the fuel cell (FC) 3. What is more, the time delay by which the air pressure P at the cathode inlet side reached the target air pressure PT can be solved, improving the response to the increasing or decreasing of the power generation amount of the fuel cell (FC) 3.

While the embodiments of the present invention have been described, it should be noted that the present invention is not restricted thereto and various modification can be made without departing from the scope and the sprits of the present invention.

What is claimed is:

1. In a fuel cell system comprising a fuel cell for generating power, a compressor for controlling a flow amount of a cathode gas supplied to the fuel cell, and a pressure control valve for controlling a pressure of the cathode gas in the fuel cell, a method for controlling the fuel cell system to change an amount of power generated by the fuel cell, the method comprising the steps of:

setting a target flow amount of the cathode gas that corresponds to a target amount of power to be generated by the fuel cell;

defining a transition period during which the flow amount converges to the target flow amount;

setting a target pressure of the cathode gas that corresponds to the target flow amount; and during at least a portion of the transition period,
measuring the actual flow amount of the cathode gas, and controlling the pressure of the cathode gas so that the cathode gas attains the target pressure by opening or closing the pressure control valve by an opening amount that is based on the measured actual flow amount of the cathode gas.

2. The method of claim 1, further comprising the step of:
controlling the pressure of the cathode gas after the transition period to achieve the target pressure, the controlling performed based on a feedback of the pressure of the cathode gas.

3. The method of claim 2, wherein the pressure of the cathode gas is controlled after the transition period without regard to the flow amount of the cathode gas.

4. The method of claim 1, wherein the pressure of the cathode gas is controlled during the transition period without regard to a feedback of the pressure of the cathode gas.

5. The method of claim 1, wherein the flow amount of the cathode gas is converged to the target flow amount using a feedback of the flow amount of the cathode gas.

6. The method of claim 1, further comprising the step of:
mapping the target amount of power to the target flow amount.

7. The method of claim 1, further comprising the step of:
mapping the target flow amount to the target pressure amount.

8. The method of claim 1, further comprising the step of:
detecting a changed flow amount of the cathode gas.

9. The method of claim 1, wherein an opening of the pressure control valve for controlling the pressure of the cathode gas is decreased at an initial stage of the transition period and thereafter the opening of the pressure control valve is increased following an increase of the flow amount of the cathode gas.

* * * * *

UNITED STATES PATENT AND TRADEMARK OFFICE
CERTIFICATE OF CORRECTION

PATENT NO. : 7,998,634 B2  
APPLICATION NO. : 11/477692  
DATED : August 16, 2011  
INVENTOR(S) : Kouji Kurosaki et al.

Page 1 of 1

It is certified that error appears in the above-identified patent and that said Letters Patent is hereby corrected as shown below:

On the Title page, column 1, item No. (63) should read:

Item (63) Continuation of application No. 09/915,936, filed on July 25, 2001, now Pat. No. 7,297,427."

Signed and Sealed this  
Twenty-second Day of November, 2011

David J. Kappos  
*Director of the United States Patent and Trademark Office*